Figure 1:
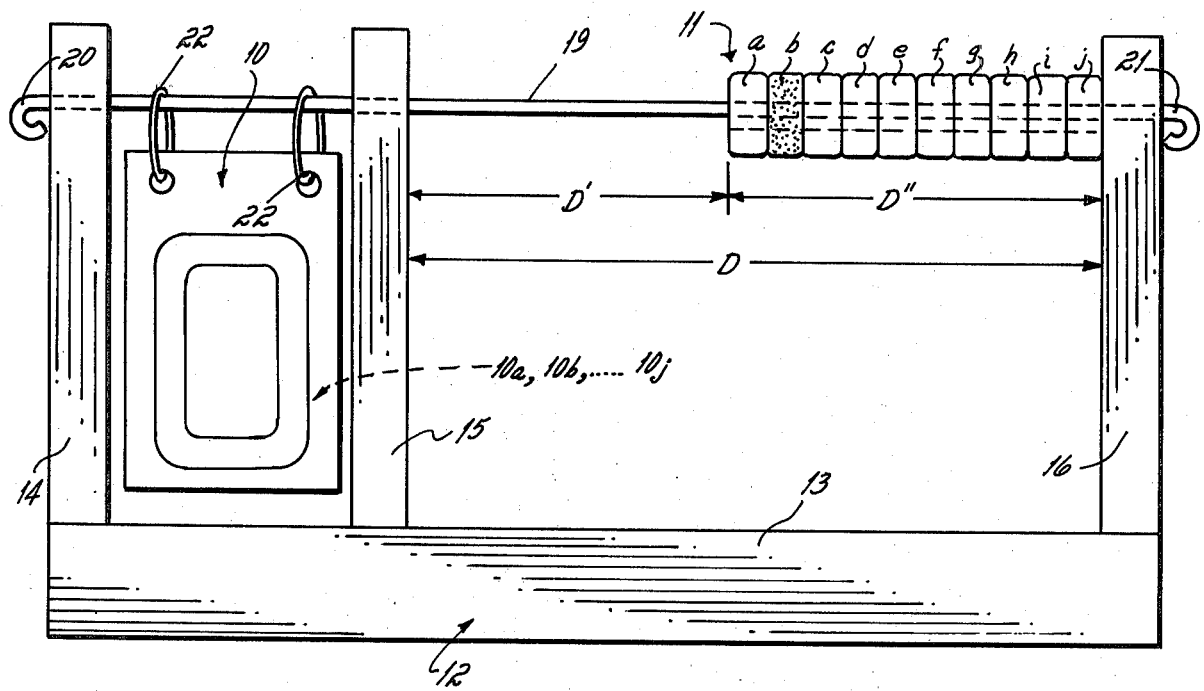

United States Patent [19]

Devanney

[11] 4,176,472

[45] Dec. 4, 1979

[54] NUMBERS TEACHING AID

[76] Inventor: Mary T. Devanney, 2665 Section Rd., Cincinnati, Ohio 45237

[21] Appl. No.: 867,816

[22] Filed: Jan. 9, 1978

[51] Int. Cl.² ............................................. G09B 19/02
[52] U.S. Cl. ......................................................... 35/32
[58] Field of Search .................. 35/31 R, 31 A, 31 B, 35/31 G, 32, 33

[56] References Cited

U.S. PATENT DOCUMENTS

| 378,866 | 3/1888 | Clark et al. | 35/33 |
| 380,532 | 4/1888 | Siefert | 35/32 X |
| 1,244,000 | 10/1917 | Soltoft | 35/31 G |
| 1,466,501 | 8/1923 | Gamble | 35/31 B X |
| 1,664,808 | 4/1928 | Cooper | 35/32 X |
| 2,867,917 | 1/1959 | Carlton | 35/33 UX |
| 3,811,205 | 5/1974 | Pitzler | 35/32 |

Primary Examiner—William H. Grieb
Attorney, Agent, or Firm—Wood, Herron & Evans

[57] ABSTRACT

A numbers teaching aid particularly useful in teaching single digit numbers to children. The teaching aid comprises a series of flip cards in which each flip card illustrates a number in the number sequence of 0–10, and a plurality of beads equal in number to the highest flip card number. The beads are aligned on a rod in an unchangeable sequence, and are slidable on that rod relative one to another between a storage position and a number equivalent position. The numbers on the flip cards are colored different colors, and the beads are likewise colored different colors, the color of each bead in the number equivalent position being the same as the color of that flip card number to which that bead is an equivalent.

3 Claims, 2 Drawing Figures

U.S. Patent  Dec. 4, 1979  4,176,472

NUMBERS TEACHING AID

This invention relates to teaching aids. More particularly, this invention relates to a numbers teaching aid.

Teaching aids are, of course, very well known to the prior art and are widely used by school personnel. And numbers teaching aids of differing structures and using different methods are likewise known to the prior art. However, one of the most difficult concepts for the young school child to grasp is that of the single digit number sequence which sequence constitutes the keystone of the field of mathematics.

Accordingly, it has been the primary objective of this invention to provide an improved numbers teaching aid that incorporates a novel structure and learning method by which single digit numbers can be taught to children of a very young age, e.g., of kindergarten age or younger.

It has been another objective of this invention to provide an improved numbers teaching aid that incorporates a novel structure and learning method by which, through coordination of colors employed on flip cards and beads, a young child can be taught single digit numbers.

In accord with these objectives, the numbers teaching aid of this inventin includes a series of flip cards in which each flip card illustrates a number in a number sequence of 0–10 and a plurality of beads equal in number to the highest flip card number. The beads are aligned on a rod in an unchangeable sequence, are slidable on that rod relative one to another between a storage position and a number equivalent position. The numbers on the flip cards are colored different colors, and the beads are likewise colored different colors, the color of each bead in the number equivalent position being the same as the color of that flip card number to which that bead is an equivalent.

The numbers teaching method of this invention permits a teacher either (a) to arrange the beads in a number equivalent position with the student selecting that flip card which illustrates a number equal to the number of beads in that number equivalent position and, therefore, a number with the same color as the last bead added to that number equivalent position, or (b) to arrange the flip cards to illustrate a number with the student then transferring a number of beads from the storage position to the number equivalent position, the color of the last bead transferred which is equivalent to the flip card number being the same color as that of the flip card number.

Figure 2:
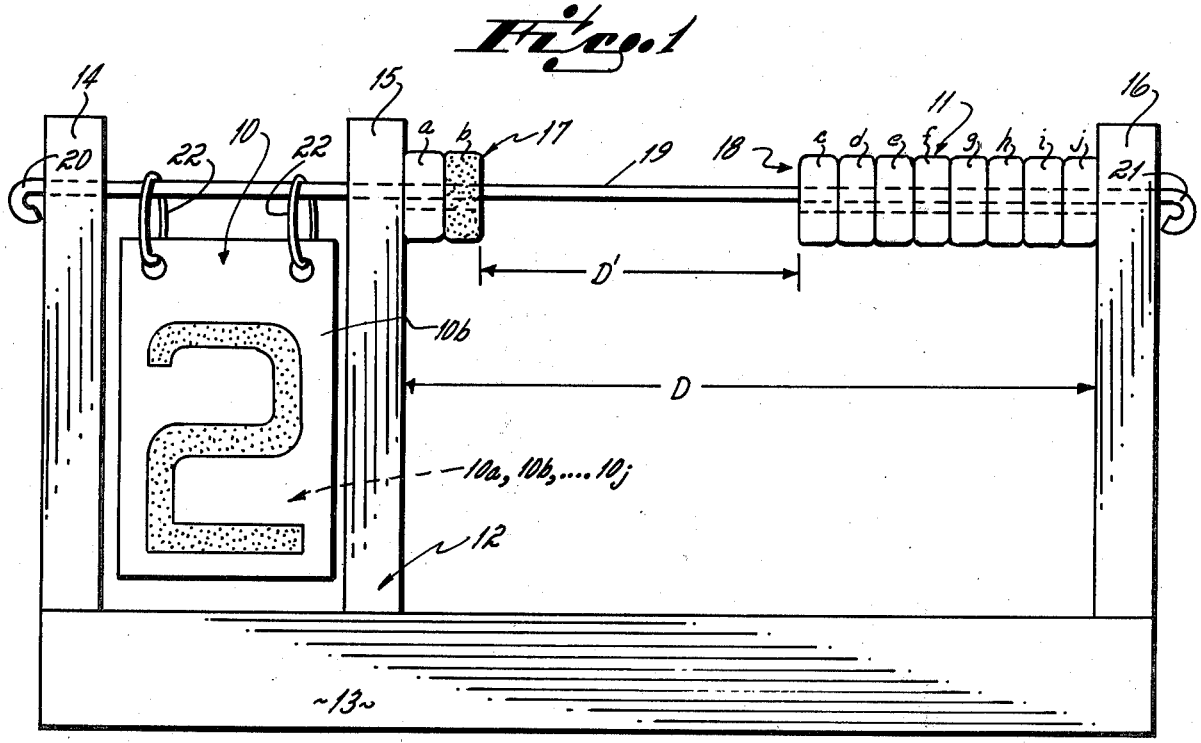

Other objectives and advantages will be more apparent from the following detailed description taken in conjunction with the drawings in which:

FIG. 1 illustrates the numbers teaching aid structure in accord with the principles of this invention in a first teaching posture; and FIG. 2 illustrates the numbers teaching aid in a second teaching posture.

The numbers teaching aid of this invention basically comprises a series of flip cards 10 and a plurality of beads 11. The flip cards 10 and the beads are structurally mounted on a framework 12 that includes a base 13 and three posts 14–16 extending vertically upward therefrom. The two posts 14, 15 at one end of the base are spaced from one another to admit the clip cards 10 therebetween. The distance D between the two posts 15, 16 at the base's other end is sized to admit the plurality of beads 11 therebetween and, in addition, to permit a discrete distance D' to be defined between a first group 17 of beads adjacent center post 15 and the second group 18 of beads adjacent end post 16 when the beads are separated into a teaching posture as illustrated in FIG. 2. The base 13 also includes a support rod 19 extending through the three posts 14–16 adjacent the tops thereof, the support rod thereby mounted in spaced parallel relation to the base. The support rod 19 is retained in connected relation with the base 13 by loops 20, 21 formed at each end thereof.

The framework's support rod 19 carries a plurality of flip cards 10 equal to the number of numbers with which the teaching aid is concerned. In the preferred embodiment, a separate flip card 10 will be provided for each of the one digit numbers 0, 1, 2, 3, 4, 5, 6, 7, 8, 9, and for the two digit number 10. However, it will be understood to those skilled in the art that the number of flip cards 10 provided may be equal to the number of single digit numbers in the number sequence 0 to 9, if desired by the user. In the case of the 0 to 10 number sequence, however, eleven separate cards 10 are provided, and in the 0–9 number sequence ten separate cards are provided. The separate cards 10 are retained in flip card configuration by rings 22. And when in flip card configuration, the numbers 0–10 or 0–9 on successive cards are provided in numerical sequence; this sequence is unchangeable because of the assembly established by rings 22. The flip card configuration so established by rings 22 is retained when the cards 10 are assembled on the support rod 19 of the framework 12 by rings 22 also enclosing that rod 19. Thus, and in use, the flip cards 10 may be simply flipped or rotated in numerical sequence relative to the flip cards' axes as defined by the support rod 19.

The framework's support rod 19 also carries or mounts a number of beads 11 equal to the number of flip cards 10 except that no bead is provided for the digit 0 if a flip card is provided with that digit 0. The beads 11 are mounted on the rod 19 in a set sequence, and that sequence is not changeable even though the beads are all movable relative one to the other along the length D of the rod 19. As previously noted, the bead section length D of the rod 19 is of a length significantly greater than the length D" of all of the beads 11 when all those beads are butted up one against the other, and against one of the posts 15 or 16. This additional length D' of the rod 19 permits the beads to be subdivided or subgrouped into two separate groups 17, 18, one adjacent the center post 15 to establish a number equivalent position and the other adjacent end post 16 to establish a storage position. This permits one or more beads 11 to be moved right to left from the storage group 18 position adjacent to the number equivalent group 17 position, the number equivalent group position thereby being located immediately adjacent or next to the flip card 10 group itself. This relation of the two bead subgroups 17, 18 relative to the flip card 10 group is important in the use of the numbers teaching aid of this invention, as described more particularly below.

Importantly with respect to the numbers teaching aid of this invention, and the use method thereof, the beads in the bead section are each provided a different color. For example, and viewing from left to right the beads as in normal reading fashion, the first bead 11a is purple, the second bead 11b is orange, the third bead 11c is dark green, the fourth bead 11d is dark blue, the fifth bead 11e is red, the sixth bead 11f is yellow, the seventh bead 11g is light blue, the eighth bead 11h is pink, the ninth bead 11i is light green, and the tenth bead is black 11j. The numbers 1-10 on the various flip cards 10a-10j are of the same color as the beads reading from left to right. In other words, the number 1 is printed on the flip card 10a in purple, the number 2 is printed in orange on its flip card 10b, the number 3 is printed in dark green on its flip card 10c, the number 4 is printed in dark blue on its flip card 10d, the number 5 is printed in red on its flip card 10e, the number 6 is printed in yellow on its flip card 10f, the number 7 is printed in light blue on its flip card 10g, the number 8 is printed in pink on its flip card 10h, the number 9 is printed in light green on its flip card 10i, and the number 10 is printed in black on its flip card 10j. As previously noted, there is no bead for the digit 0, and the digit 0 is simply outlined in black, i.e., is white on a white flip card, 10, so that it, in effect, has no color. Thus the number 1-10 on each flip card 10 is of the same color as the related bead in the line of beads 11 when those beads are viewed or read from left to right as shown in the Figures.

In use, and as is shown in FIG. 2, the teacher may move the flip cards 10 to that attitude where an orange number 2 appears on the chart. As the teacher initially so positions the flip cards 10, the teacher also initially lines up or locates all the beads in the storage subgroup 18 against end post 16. The objective here is for the student to indicate to the teacher that he understands the mathematical significance of the number 2. And the student indicates comprehension by moving the first two beads 11a, 11b from right to left, i.e., from the storage position 17 to the number equivalent position 18 as shown in FIG. 2. The second bead 11b is colored orange, as previously noted, and since the digit 2 is also colored orange, as previously noted, the student learns to recognize and comprehend the relationship between two beads and the number 2. Alternatively, the teacher initially may move two beads 10a, 10b from the storage position 17 to the number equivalent position 18 and request that the student arrange the flip cards 10 to find the number that numerically identifies the number of beads so moved. In this mode of use, the flip cards 10 are initially arranged so that the visible card illustrates the digit 0 as shown in FIG. 1. The student then flips the flip cards 10 until the card 10b with the number 2 appears, the student being certain that is the number to be selected because the orange color of the number 2 on card 10b is the same as the orange color on the last bead 11b in the line in the number equivalent position 17. This same procedure may be used to teach any of the numbers 1-10 on the flip cards 10a-10j since all of those numbers have an identically color-coded bead 11a-11j. Thus, the numbers teaching aid of this invention, through color coordination, is used to teach the student the meaning or significance of the numbers on the flip cards 10a-10j relative to a set and unchangeable line sequence of beads 11a-11j.

The digit 0, as previously mentioned, has no bead. This, of course, is appropriate because of the numerical significance of the digit 0. Hence, and as a learning tool, when all the beads in the bead rack are at the storage position 18 as shown in FIG. 1, i.e., when no bead is in the number equivalent position, then the student is aware that the digit 0 means nothing.

Having described in detail the preferred embodiment of my invention, what I desire to claim and protect by Letters Patent is:

1. A numbers teaching aid for teaching the significance of numbers, said aid comprising,
   a series of flip cards positioned in a set and unchangeable sequence, each card having single digit indicia only thereon, said flip cards being arranged in numerical order as determined by the single digit indicia, and the color of each digit being different from the color of every other digit, and
   a plurality of beads positioned in a set and unchangeable sequence, the number of beads being equal in number to the number of flip cards if no flip card is provided with the digit 0 and equal in number to the number of flip cards minus one if one of the flip cards is provided with the digit 0, the color of each bead being different from the color of every other bead, the color sequence of said beads being the same as the color sequence of said digits, and said beads being movable from a storage position into a number equivalent position where the color of the last bead moved to the number equivalent position from the storage position will be the same as the color of that number on an exposed flip card where the number of beads so moved is equal to the digit on the flip card.

2. A teaching aid as set forth in claim 1 including,
   a rod on which said beads are mounted, said beads being slidable between said storage position located toward one end of said rod and said number equivalent position located toward the other end of said rod.

3. A teaching aid as set forth in claim 2 including,
   a framework, said framework mounting said flip cards and said beads.

* * * * *